United States Patent
Allen et al.

(10) Patent No.: US 10,788,951 B2
(45) Date of Patent: Sep. 29, 2020

(54) DATA PROCESSING SYSTEM WITH MACHINE LEARNING ENGINE TO PROVIDE DYNAMIC INTERFACE FUNCTIONS

(71) Applicant: Bank of America Corporation, Charlotte, NC (US)

(72) Inventors: Morgan S. Allen, Charlotte, NC (US); Jason Daniel Latta, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 371 days.

(21) Appl. No.: 15/440,419

(22) Filed: Feb. 23, 2017

(65) Prior Publication Data

US 2018/0239500 A1  Aug. 23, 2018

(51) Int. Cl.
*G06F 3/0482* (2013.01)
*G06F 3/0488* (2013.01)
*G06F 21/62* (2013.01)
*G06N 20/00* (2019.01)

(52) U.S. Cl.
CPC .......... *G06F 3/0482* (2013.01); *G06F 3/0488* (2013.01); *G06F 21/629* (2013.01); *G06N 20/00* (2019.01)

(58) Field of Classification Search
CPC .... G06F 3/0482; G06F 3/0488; G06F 21/629; G06N 20/00
USPC ........................................ 715/742, 743, 745
See application file for complete search history.

(56) References Cited

U.S. PATENT DOCUMENTS

| | | | | |
|---|---|---|---|---|
| 5,117,288 A | * | 5/1992 | Eisenhardt | H04N 19/50 348/607 |
| 5,412,769 A | * | 5/1995 | Maruoka | G06F 17/18 345/440 |
| 6,577,323 B1 | * | 6/2003 | Jamieson | G05B 23/0232 345/440 |
| 6,934,690 B1 | * | 8/2005 | Van Horn | G06Q 30/06 705/26.2 |
| 8,046,313 B2 | * | 10/2011 | Hoffberg | G06F 3/0482 706/14 |
| 8,260,938 B2 | | 9/2012 | Gupta et al. | |

(Continued)

*Primary Examiner* — Andrew R Dyer
(74) *Attorney, Agent, or Firm* — Banner & Witcoff, Ltd.; Michael A. Spring

(57) ABSTRACT

Systems for predicting features to be accessed by a user and generating a customized user interface are provided. In some examples, a computing platform may receive a request to access a system. In some examples, a content data stream may be received including data associated with the identity of the user, current date and time information, and the like. Data may be extracted from the content stream and analyzed, based on one or more machine learning datasets (generated internally or received from an external source), to predict a likely function or feature the user may access. In some examples, access to other features may be disabled. Responsive to identifying the likely feature, the system may enable access to the predicted feature and may generate a customized user interface including the predicted feature. The customized and dynamic user interface may include and place the predicted feature in a predetermined location on the user interface, in a size and/or format other than standard.

25 Claims, 11 Drawing Sheets

(56) References Cited

U.S. PATENT DOCUMENTS

| | | | |
|---|---|---|---|
| 8,554,653 B2 * | 10/2013 | Falkenborg | G06Q 30/0255 705/35 |
| 8,566,696 B1 * | 10/2013 | Hamon | G06F 16/957 715/205 |
| 8,626,579 B2 * | 1/2014 | Fordyce, III | G06Q 20/10 705/14.1 |
| 8,639,567 B2 * | 1/2014 | Winters | G06Q 30/0255 705/14.1 |
| 8,650,139 B2 | 2/2014 | Jain et al. | |
| 8,712,931 B1 | 4/2014 | Wahlen | |
| 8,750,906 B2 * | 6/2014 | Winkler | G06Q 10/10 455/457 |
| 8,867,807 B1 * | 10/2014 | Fram | G06F 19/321 382/128 |
| 9,159,084 B2 * | 10/2015 | Magpayo | G06Q 30/0256 |
| 9,372,829 B1 | 6/2016 | Rahmani et al. | |
| 9,513,763 B1 * | 12/2016 | Adams | G06F 3/0481 |
| 9,558,452 B2 * | 1/2017 | Guiver | G06N 7/00 |
| 9,857,958 B2 * | 1/2018 | Ma | G06F 16/904 |
| 10,007,915 B2 * | 6/2018 | Singh | G06Q 30/0226 |
| 10,235,461 B2 * | 3/2019 | Elkherj | G06F 16/951 |
| 10,298,599 B1 * | 5/2019 | Zhang | H04L 67/42 |
| 10,318,630 B1 * | 6/2019 | Kesin | G06F 40/289 |
| 10,325,314 B1 * | 6/2019 | Kapczynski | G06Q 40/025 |
| 10,332,108 B2 * | 6/2019 | Ciurea | G06Q 20/383 |
| 10,395,762 B1 * | 8/2019 | Fram | G16H 30/20 |
| 10,546,332 B2 * | 1/2020 | Carlson | G06Q 30/0222 |
| 10,607,219 B2 * | 3/2020 | Ciurea | G06Q 20/405 |
| 2006/0136830 A1 * | 6/2006 | Martlage | G06F 17/243 715/745 |
| 2009/0271860 A1 * | 10/2009 | Nonaka | H04L 9/3278 726/16 |
| 2010/0169177 A1 * | 7/2010 | Griffith | G06Q 30/0255 705/14.53 |
| 2010/0280882 A1 * | 11/2010 | Faith | G06Q 20/4016 705/7.37 |
| 2011/0035278 A1 * | 2/2011 | Fordyce, III | G06Q 30/0267 705/14.49 |
| 2011/0087519 A1 * | 4/2011 | Fordyce, III | G06Q 30/0201 705/7.29 |
| 2011/0087547 A1 * | 4/2011 | Amaro | G06Q 30/02 705/14.53 |
| 2011/0093335 A1 * | 4/2011 | Fordyce, III | G06Q 20/40 705/14.53 |
| 2011/0231224 A1 * | 9/2011 | Winters | G06Q 30/0201 705/7.29 |
| 2011/0231225 A1 * | 9/2011 | Winters | G06Q 30/0201 705/7.29 |
| 2011/0231257 A1 * | 9/2011 | Winters | G06Q 30/0255 705/14.53 |
| 2011/0231258 A1 * | 9/2011 | Winters | G06Q 30/0255 705/14.53 |
| 2011/0231305 A1 * | 9/2011 | Winters | G06Q 30/02 705/39 |
| 2011/0264497 A1 * | 10/2011 | Clyne | G06Q 30/0215 705/14.17 |
| 2011/0264567 A1 * | 10/2011 | Clyne | G06Q 40/12 705/30 |
| 2011/0264581 A1 * | 10/2011 | Clyne | G06Q 20/10 705/39 |
| 2011/0288918 A1 * | 11/2011 | Cervenka | G06Q 20/40 705/14.17 |
| 2011/0302022 A1 * | 12/2011 | Fordyce, III | G06Q 30/0251 705/14.35 |
| 2011/0313835 A1 * | 12/2011 | Falkenborg | G06Q 30/0224 705/14.25 |
| 2011/0313900 A1 * | 12/2011 | Falkenborg | G06Q 30/0202 705/30 |
| 2012/0022945 A1 * | 1/2012 | Falkenborg | G06Q 30/0255 705/14.53 |
| 2012/0066062 A1 * | 3/2012 | Yoder | G06Q 30/02 705/14.51 |
| 2012/0066065 A1 * | 3/2012 | Switzer | G06Q 20/10 705/14.53 |
| 2012/0078697 A1 * | 3/2012 | Carlson | G06Q 20/40 705/14.23 |
| 2012/0078699 A1 * | 3/2012 | Carlson | G06Q 20/40 705/14.23 |
| 2012/0109709 A1 * | 5/2012 | Fordyce, III | G06Q 30/0201 705/7.29 |
| 2012/0109749 A1 * | 5/2012 | Subramanian | G06Q 30/0255 705/14.53 |
| 2012/0191525 A1 * | 7/2012 | Singh | G06O 30/0233 705/14.33 |
| 2012/0215610 A1 * | 8/2012 | Amaro | G06O 30/02 705/14.23 |
| 2012/0271691 A1 * | 10/2012 | Hammad | G06Q 30/02 705/14.17 |
| 2012/0271770 A1 * | 10/2012 | Harris | G06Q 40/00 705/67 |
| 2013/0066771 A1 * | 3/2013 | Ciurea | G06O 30/0207 705/39 |
| 2013/0073464 A1 * | 3/2013 | Magpayo | G06Q 30/0256 705/44 |
| 2013/0124417 A1 * | 5/2013 | Spears | H04L 67/30 705/44 |
| 2013/0325667 A1 * | 12/2013 | Satyavolu | G06Q 30/0629 705/26.64 |
| 2013/0325681 A1 * | 12/2013 | Somashekar | H04M 15/8011 705/35 |
| 2013/0332361 A1 * | 12/2013 | Ciurea | G06Q 20/405 705/44 |
| 2013/0332362 A1 * | 12/2013 | Ciurea | G06Q 20/383 705/44 |
| 2014/0040134 A1 * | 2/2014 | Ciurea | G06Q 20/383 705/44 |
| 2014/0059487 A1 * | 2/2014 | Baumann | G06F 3/0482 715/811 |
| 2014/0236678 A1 * | 8/2014 | Akerman | G06F 16/9537 705/7.34 |
| 2014/0278051 A1 * | 9/2014 | McGavran | G01C 21/00 701/400 |
| 2015/0170175 A1 * | 6/2015 | Zhang | H04M 15/44 705/7.33 |
| 2015/0193554 A1 * | 7/2015 | Yang | G06F 16/9535 715/205 |
| 2017/0031575 A1 * | 2/2017 | Dotan-Cohen | G06F 3/038 |
| 2017/0091673 A1 * | 3/2017 | Gupta | G06N 5/022 |

\* cited by examiner

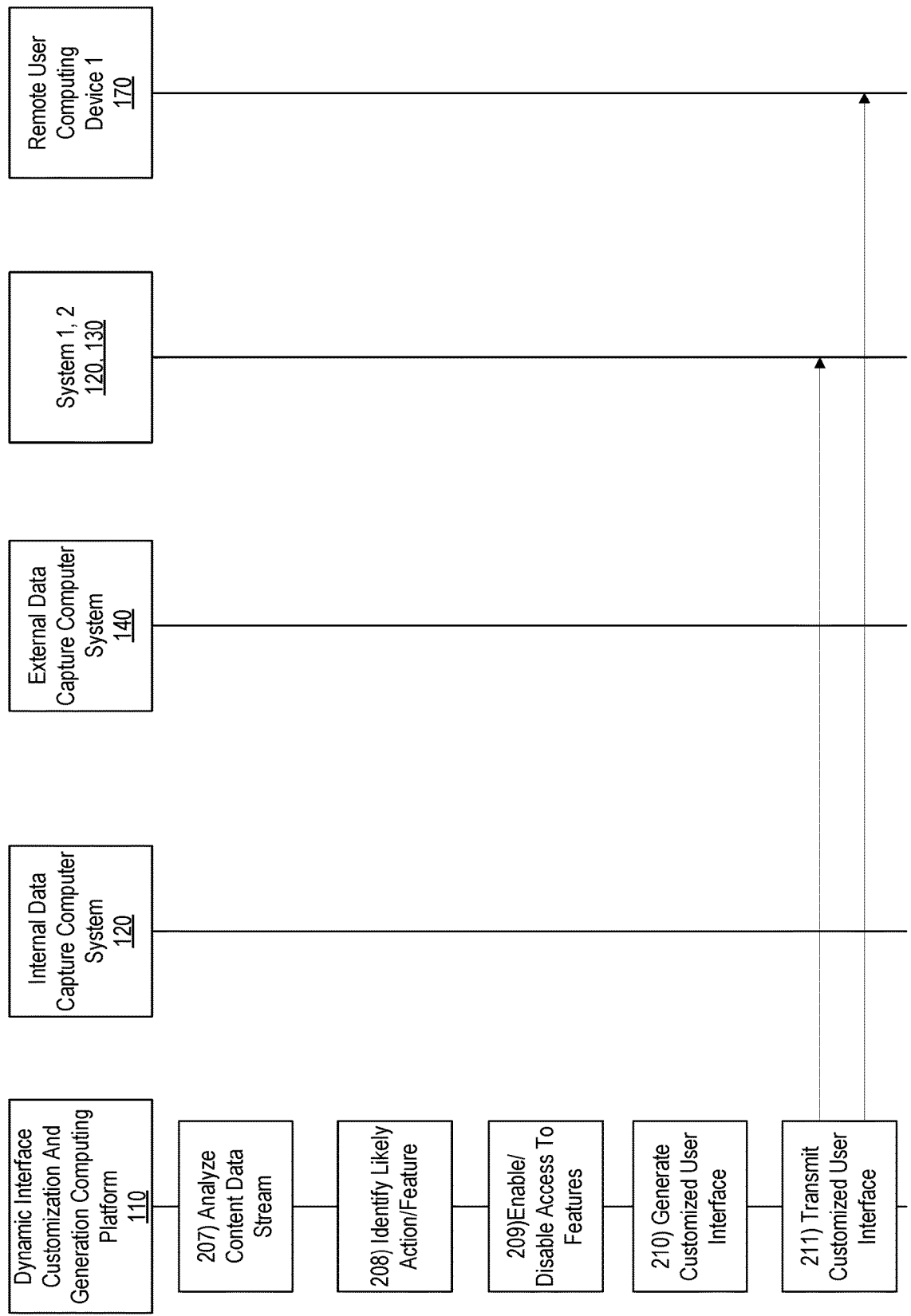

DATA PROCESSING SYSTEM WITH MACHINE LEARNING ENGINE TO PROVIDE DYNAMIC INTERFACE FUNCTIONS

BACKGROUND

Aspects of the disclosure relate to electrical computers, data processing systems, and machine learning. In particular, one or more aspects of the disclosure relate to implementing and using a data processing system with a machine learning engine to provide dynamic interface customization and generation functions.

Large enterprise organizations may deploy, operate, maintain, and use many different computer systems, which may provide many different client-focused services. In order to improve client experiences, organizations are often looking for ways to make processes more efficient, streamlined to particular users, and the like. However, because of the amount of data to be processed and the limited amount of time in which to evaluate and present the data to the end user, it is often difficult for organizations to provide a customized user experience. Further, accessing and consolidating data from a plurality of different sources exacerbates the challenge.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with providing customized, dynamic interfaces via a plurality of different systems.

In some examples, a system, computing platform, or the like, may generate one or more machine learning datasets. The one or more machine learning datasets may be generated based on data from various sources, including historical data associated with previous user interaction or activity within a system, user activity in systems external to the entity implementing the system, frequency of particular activity taken, sequences of actions, and the like. In some arrangements, one or more machine learning datasets may be received from an external entity.

In some arrangements, the system may receive a request to access a system. For example, the system may receive a notification indicating that a user is requesting access to a system, such as an online or mobile application, self-service kiosk, call center system, or the like. In some examples, a content data stream may be received including data associated with the identity of the user, current date and time information, and the like.

In some examples, data may be extracted from the content stream and analyzed, based on the one or more machine learning datasets, to determine or predict a likely function or feature the user may access. In some examples, access to other features (e.g., features not identified as likely to be accessed by the user) may be disabled. Responsive to identifying the likely feature, the system may enable access to the predicted feature and may generate a customized user interface including the predicted feature. The customized user interface may include the predicted feature in a predetermined location on the interface, in a larger than standard font size, in bold, or the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for implementing and using a data processing system with a machine learning engine to provide dynamic interface functions in accordance with one or more aspects described herein;

DETAILED DESCRIPTION

Figure 1A:
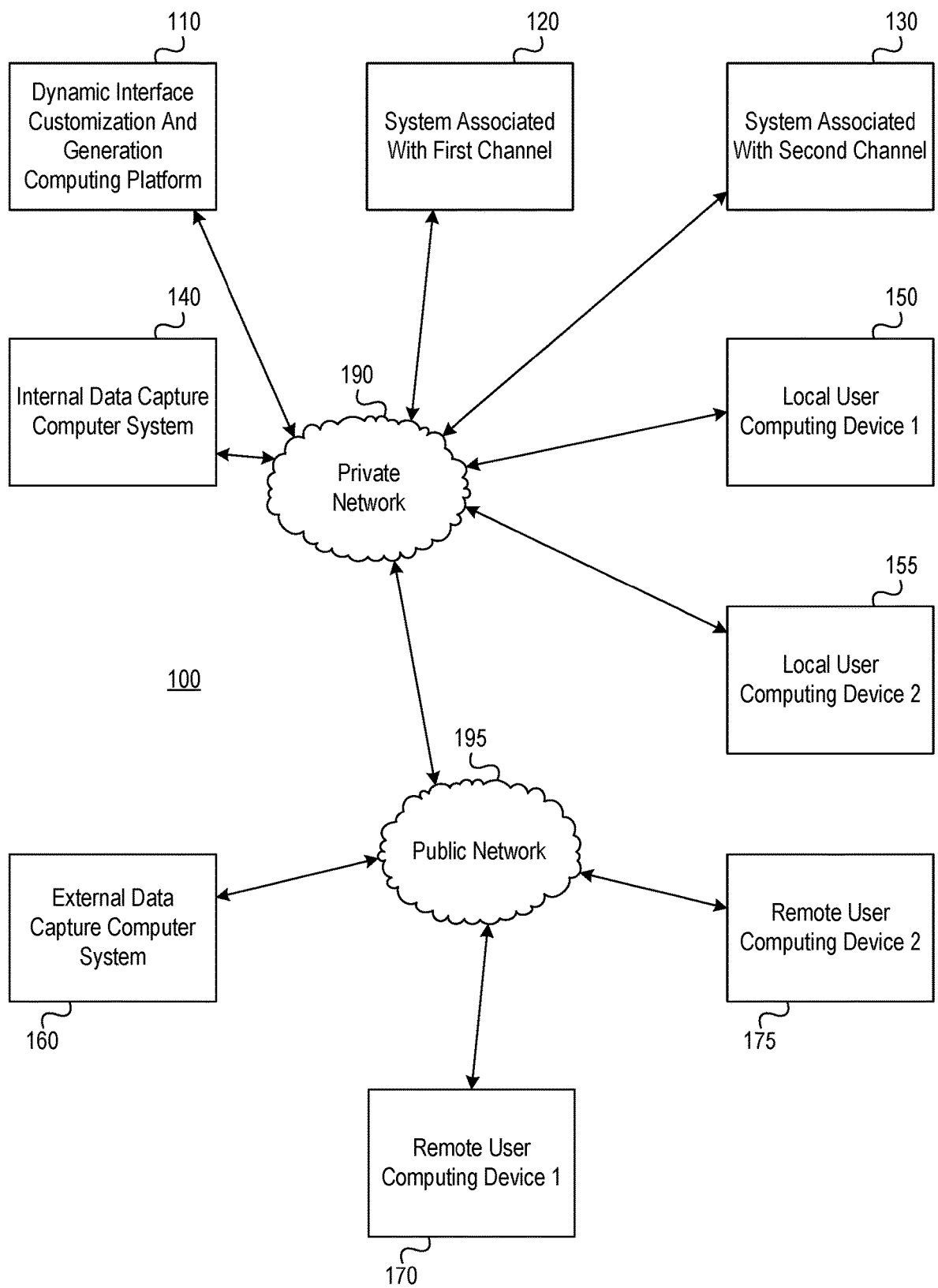
FIGS. 1A and 1B depict an illustrative computing environment for implementing and using a data processing system with a machine learning engine to provide dynamic interface functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to predict one or more functions or features likely to be accessed by a user via a system and generate a customized user interface based on the prediction. In some examples, the system may include an online or mobile application, a self-service kiosk, a call center system, and the like.

In conventional systems, a user may request access to a system and, upon being granted access (e.g., entered authorized login credentials, biometric data, or the like) may be presented with a generic (e.g., non-customized) user interface providing a plurality of features and/or functions selectable by the user. However, many users perform the same or similar function at certain times of the day, days of week, days of the month, or the like. For instance, a user may login to an online banking application each morning at 9:00 a.m. to check his or her balance. In another example, a user may visit a same Automated Teller Machine (ATM) every other Friday (e.g., payroll Fridays) at 5:30 p.m. to make a withdrawal. In still another example, a user may login to an online banking system to set up a bill payment on the first of each month. Various other example functions or features, times, dates, or the like, may be used without departing from the invention.

Accordingly, aspects described herein provide for the use of machine learning to monitor user access to systems, user activity (e.g., both internal activity within the systems and external activity) and the like, to predict one or more features or functions likely to be accessed by a user based on time, day, date, geographic location, recent activity, or the like, at or for which the user is accessing the system. For example, historical data associated with user activity within one or more systems of an entity, activity associated with systems external to the entity (e.g., internet browsing activity), and the like, may be used to identify patterns or sequences, identify functions or features frequently accessed by a user.

In some examples, data (e.g., streaming data) from a system may be received in real-time and processed in real-time, based on one or more machine learning datasets, to identify one or more features or functions likely to be accessed by the user. Access to the identified one or more features may be enabled, while access to other features (e.g., those not identified as likely to be accessed by the user) may be disabled.

In some arrangements, a customized user interface may then be generated and displayed to a user. In some examples, the customized user interface may include only the identified features or functions likely to be accessed by the user. The identified features or functions may be displayed in a predetermined position on the interface. In some examples, the interface may include the identified features or functions, as well as other features or functions, and the other features or functions may include an indication that access to the other features or functions is not enabled.

In some examples, the customized user interface may also include content related to data external to the system, entity, or the like. For instance, content or links to websites for entities other than the entity implementing the system may be provided in a customized user interface based on, for example, recent activity, historical patterns of activity, and the like.

These and various other arrangements will be discussed more fully below.

Figure 1B:
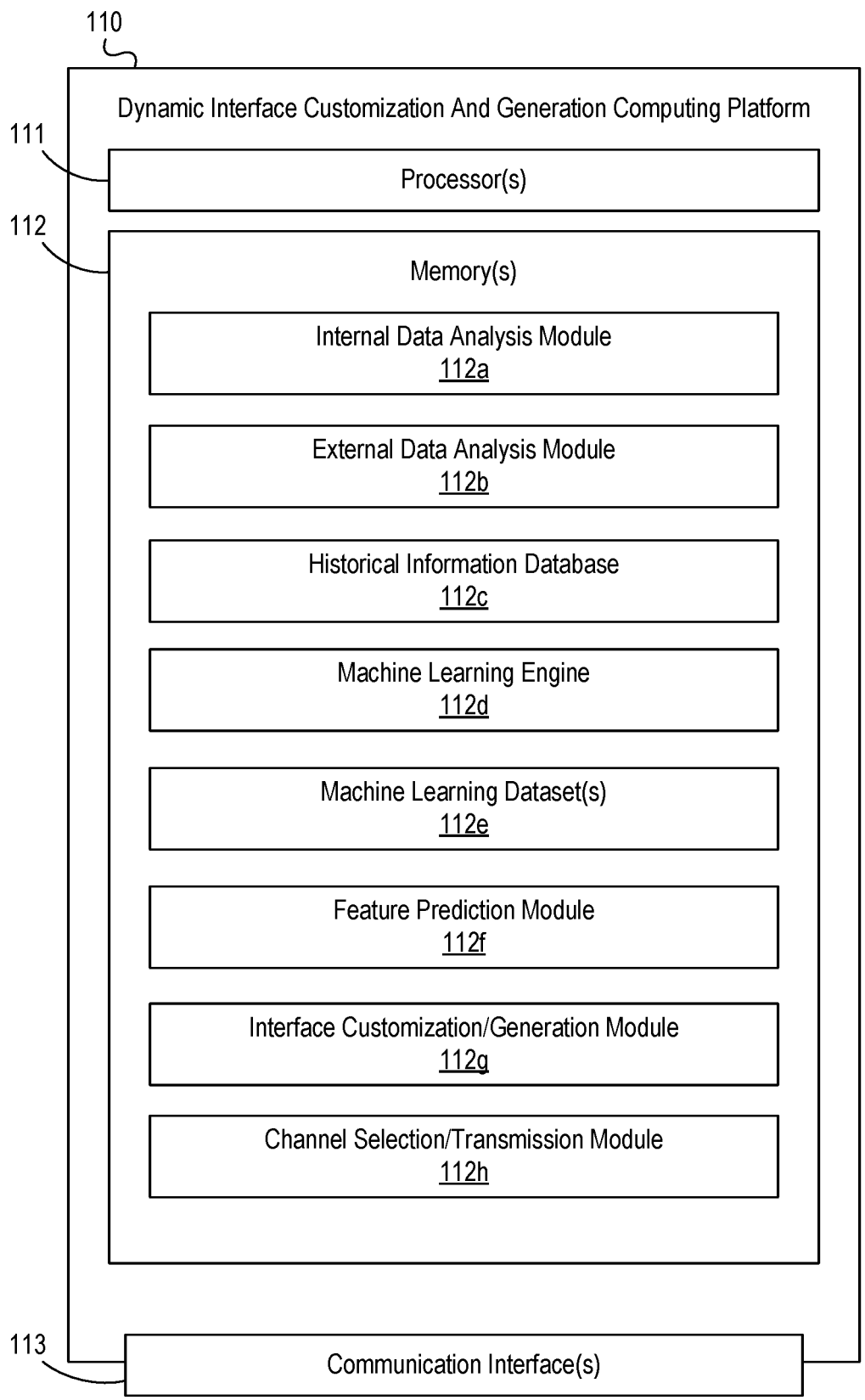

FIGS. 1A and 1B depict an illustrative computing environment for implementing and using a data processing system with a machine learning engine to provide dynamic interface functions in accordance with one or more aspects described herein. Referring to FIG. 1A, computing environment 100 may include one or more computing devices and/or other computing systems. For example, computing environment 100 may include a dynamic interface customization and generation computing platform 110, a system associated with a first channel of communication 120, a system associated with a second channel of communication 130, an internal data capture computer system 140, an external data capture computer system 160, a first local user computing device 150, a second local user computing device 155, a first remote user computing device 170, and a second remote user computing device 175.

Dynamic interface customization and generation computing platform 110 may be configured to host and/or execute a machine learning engine to provide automated dynamic interface functions, as discussed in greater detail below. In some instances, dynamic interface customization and generation computing platform 110 may monitor one or more systems, such as system 120, 130, receive or identify a request to access one or more systems, such as system 120, 130, (or other systems as will be discussed more fully below), extract data from the request to access the system, predict, based on one or more machine learning datasets, a likely one or more functions or features to be accessed by a user requesting access, enable access to the likely one or more functions associated with the system based on the extracted data, disable access to one or more functions associated with the system not identified as likely to be accessed by the user based on the extracted data, and generate one or more user interfaces including the one or more functions or features likely to be accessed by the user. In some examples, generating the user interface includes not permitting access to the disabled functions from the generated user interface (e.g., an additional interface may be selected to access the one or more disabled functions).

System associated with a first channel 120 and system associated with a second channel 130 may be one or more of a variety of systems employed by an entity to perform one or more business functions. Although two systems 120, 130 are shown in FIG. 1A, more or fewer systems may be monitored without departing from the invention. In some examples, the systems 120, 130 may be associated with different points or channels of access for a user. For instance, system associated with a first channel 120 may be an ATM or other self-service kiosk. In another example, system associated with second channel 130 may be a computer system associated with an automated (or partially automated) call center. In still other examples, system associated with first channel 120 may be system supporting an online or mobile banking application executing on one or more computing devices, such as local user computing device 150, local user computing device 155, remote user computing device 170, and/or remote user computing device 175.

Internal data capture computer system 140 may be configured to monitor, collect, store and/or transmit data related to processed events, transactions, or other actions taken by one or more users. For instance, the internal data capture computer system 140 may include hardware and/or software configured to monitor one or more systems and collect data associated with one or more users accessing one or more systems, such as systems 120, 130. This may include times and dates of access to one or more systems 120, 130 (including, for example, day of week, day of month, or the like). The data collected may further include one or more features or functions selected by the user, geographic location of the user when accessing one or more particular functions, and the like. The selected features or functions may be linked to the time, day, and the like information and may be used to generate one or more machine learning datasets, as will be discussed more fully below.

External data collection computer system 160 may be configured to monitor, collect, store and/or transmit data related to events, transactions, or the like, occurring at systems external to the entity. For instance, the external data collection computer system 160 may include hardware and/or software configured to monitor one or more systems external to the entity that may be accessed by a user (e.g., via one or more of local user computing device 150, 155, remote user computing device 170, 175, or the like). The systems may be monitored with appropriate permissions as needed. The data collected may include particular websites visited, types of websites visited, time, date, or the like, of visits to particular sites, functions or features accessed from particular sites, geographic location when accessing one or more sites, and the like. Collected data may be used to generate one or more machine learning datasets, as will be discussed more fully below.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. The local and remote user computing devices may be used to provide access one or more systems being monitored (e.g., from which data is collected), as well as to display one or more dynamic, customized user interfaces, as will be discussed more fully below.

In one or more arrangements, system associated with first channel 120, system associated with second channel 130, internal data capture computer system 140, external data capture computer system 160, local user computing device 150, local user computing device 155, remote user computing device 170, and remote user computing device 175 may be any type of computing device capable of receiving a user interface, receiving input via the user interface, and communicating the received input to one or more other computing devices. For example, system associated with first channel 120, system associated with second channel 130, internal data capture computer system 140, external data capture computer system 160, local user computing device 150, local user computing device 155, remote user computing device 170, and remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of system associated with first channel 120, system associated with second channel 130, internal data capture computer system 140, external data capture computer system 160, local user computing device 150, local user computing device 155, remote user computing device 170, and remote user computing device 175 may, in some instances, be special-purpose computing devices configured to perform specific functions.

Computing environment 100 also may include one or more computing platforms. For example, and as noted above, computing environment 100 may include dynamic interface customization and generation computing platform 110. As illustrated in greater detail below, dynamic interface customization and generation computing platform 110 may include one or more computing devices configured to perform one or more of the functions described herein. For example, dynamic interface customization and generation computing platform 110 may include one or more computers (e.g., laptop computers, desktop computers, servers, server blades, or the like).

As mentioned above, computing environment 100 also may include one or more networks, which may interconnect one or more of dynamic interface customization and generation computing platform 110, system associated with first channel 120, system associated with second channel 130, internal data capture computer system 140, external data capture computer system 160, local user computing device 150, local user computing device 155, remote user computing device 170, and remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic interface customization and generation computing platform 110, system associated with first channel 120, system associated with second channel 130, internal data capture computer system 140, local user computing device 150, and local user computing device 155 may be associated with an organization (e.g., a financial institution), and private network 190 may be associated with and/or operated by the organization, and may include one or more networks (e.g., LANs, WANs, virtual private networks (VPNs), or the like) that interconnect dynamic interface customization and generation computing platform 110, system associated with first channel 120, system associated with second channel 130, internal data capture computer system 140, local user computing device 150, and local user computing device 155 and one or more other computing devices and/or computer systems that are used by, operated by, and/or otherwise associated with the organization. Public network 195 may connect private network 190 and/or one or more computing devices connected thereto (e.g., dynamic interface customization and generation computing platform 110, system associated with first channel 120, system associated with second channel 130, internal data capture computer system 140, local user computing device 150, and/or local user computing device 155) with one or more networks and/or computing devices that are not associated with the organization. For example, external data capture computer system 160, remote user computing device 170, and remote user computing device 175 might not be associated with an organization that operates private network 190 (e.g., because external data capture computer system 160, remote user computing device 170, and remote user computing device 175 may be owned, operated, and/or serviced by one or more entities different from the organization that operates private network 190, such as one or more customers of the organization and/or vendors of the organization, rather than being owned and/or operated by the organization itself or an employee or affiliate of the organization), and public network 195 may include one or more networks (e.g., the internet) that connect external data capture computer system 160, remote user computing device 170, and remote user computing device 175 to private network 190 and/or one or more computing devices connected thereto (e.g., dynamic interface customization and generation computing platform 110, system associated with first channel 120, system associated with second channel 130, internal data capture computer system 140, local user computing device 150, and/or local user computing device 155).

Referring to FIG. 1B, dynamic interface customization and generation computing platform 110 may include one or more processors 111, memory 112, and communication interface 113. A data bus may interconnect processor(s) 111, memory 112, and communication interface 113. Communication interface 113 may be a network interface configured to support communication between dynamic interface customization and generation computing platform 110 and one or more networks (e.g., private network 190, public network 195, or the like). Memory 112 may include one or more program modules having instructions that when executed by processor(s) 111 cause dynamic interface customization and generation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic interface customization and generation computing platform 110 and/or by different computing devices that may form and/or otherwise make up dynamic interface customization and generation computing platform 110. For example, memory 112 may have, store, and/or include an internal data analysis module 112a. Internal data analysis module 112a may store instructions and/or data that may cause or enable the dynamic interface customization and generation computing platform 110 to receive, store and/or analyze internal data (e.g., data captured by and/or received from internal data capture computer system 140). The internal data analysis module 112a may receive the data and process the data to extract data associated with features, functions, and the like, accessed or used by a user when accessing a system (e.g., system 120, 130, or the like), identify a user associated with one or more events or transactions, identify a time and date associated with the access, and the like. This information may be used to identify or predict likely features or functions a user will access at a future time, as will be discussed more fully below.

Memory 112 may further have, store and/or include external data analysis module 112b. External data analysis module 112b may store instructions and/or data that may cause or enable the dynamic interface customization and generation computing platform 110 to receive, store, and/or analyze external data (e.g., data captured by and/or received from external data capture computer system 160). The external data analysis module 112b may receive data and process the data to extract data associated with websites accessed by a user, identify types of websites or content accessed by the user, identify time and date information associated with various user activity, and the like. This information may be used to identify or predict likely features or functions a user will access at a future time, as will be discussed more fully below.

Memory 112 may further have, store and/or include historical information database 112c. Historical information database 112c may store instructions and/or data associated with previous occurrences of a user accessing a system, functions or features accessed, and the like. In some examples, historical information database 112c may store data received from the internal data analysis module 112a and/or the external data analysis module 112b. Data from the historical information database 112c may be used to generate one or more machine learning datasets (e.g., by machine learning engine 112d).

Memory 112 may further have, store and/or include a machine learning engine 112d and machine learning datasets 112e. Machine learning engine 112d and machine learning datasets 112e may store instructions and/or data that cause or enable dynamic interface customization and generation computing platform 110 to determine or predict, in real-time and based on received content, one or more features or functions a user is likely to access, enable access to those functions, disable access to other functions not identified as likely to be accessed by the user, generate a customized user interface including the enabled functions, and the like. The machine learning datasets 112e may be based on historical data related to information identifying a user, features and/or functions of one or more systems (e.g., systems 120, 130) accessed by the user, the time and/or date at which a particular feature or function was accessed, and the like.

The machine learning engine 112d may receive data from a plurality of sources and, using one or more machine learning algorithms, may generate one or more machine learning datasets 112e. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112d may analyze data to identify patterns of activity, sequences of activity, and the like, to generate one or more machine learning datasets 112e. Additionally or alternatively, the machine learning engine 112d may analyze a frequency of activity by a user. For instance, the machine learning engine 112d may analyze data to determine whether a frequency of a particular activity by a user occurred a threshold number of times within a predetermined time period. This information may be used to generate one or more machine learning datasets 112e.

The machine learning datasets 112e may include machine learning data linking one or more actions by a user (e.g., function or feature selected, type of website visited, or the like) with a time and/or day or date of the action to identify one or more patterns or sequences of actions that may aid in predicting one or more likely functions, features, or actions for a future instance of the user accessing a system. For instance, the machine learning datasets 112e may include data linking a particular user's selection of one or more features or functions at a particular time, on a particular day of the week, on a particular day of the month, or the like. Thus, this data may enable the computing platform 110 to predict a likely future action of a user upon a user accessing a system at a particular, time, day, or the like, enable or disable access to one or more features, and generate a customized user interface based on the likely function, enabled/disabled functions, and the like.

In other examples, the machine learning datasets 112e may include data linking a particular user's internet history or search habits to particular times, dates, geographic locations, and the like (e.g., data from a variety of disparate sources external to the entity implementing the computing platform 110). This information may then enable the computing platform 110 to predict a likely future action or predict content a user may find useful and generate a customized user interface based on the likely future action or predicted content.

In some examples, one or more machine learning datasets 112e may be generated by, for example, the machine learning engine 112d. Additionally or alternatively, one or more machine learning datasets 112e may be generated by a computing device associated with a second entity different from the entity implementing the computing platform 110 and transmitted from the second entity to the dynamic interface customization and generation computing platform 110.

Memory 112 may further include feature prediction module 112f. Feature prediction module 112f may store instructions and/or data that may cause or enable the dynamic interface customization and generation computing platform 110 to receive, via a content stream from one or more systems being monitored, data from one or more systems (either internal entity systems or systems external to the entity). The received content stream may include data associated with one or more users attempting to access one or more systems (e.g., receipt of login credentials, and the like). In some examples, the content stream may be received in real-time. The feature prediction module 112f may process the received content stream to extract information identifying the user, a particular system being accessed (e.g., an online banking system, an ATM or other self-service kiosk, or the like), time and date information associated with the access or requested access, and the like, and may predict (e.g., based on one or more machine learning datasets) one or more functions or features that may be useful to the user during the current session in which the user is accessing the device. The feature prediction module 112f may enable access to the predicted function and disable access to other functions not predicted to be accessed by the user during the current session.

Memory 112 may have, store, and/or include an interface customization/generation module 112g. The interface customization/generation module 112g may store instructions and/or data that may cause or enable the dynamic interface customization and generation computing platform 110 to generate one or more customized user interfaces based on the predicted features of functions to access, enabled feature or functions, disabled features or functions, and the like. For example, the interface customization/generation module 112g may generate (e.g., in real-time) a user interface for presentation to a user upon accessing a system that may include only the features for which access has been enabled (e.g., features predicted to be accessed by the user). In some examples, other features or functions may be disabled and may be displayed as grayed-out on the user interface. In another example, the function or feature for which access is enabled may be presented in an increased font size and/or in a particular location on the interface (e.g., in a substantially central location, in a top left corner, or the like). The generated user interface may include a selectable option to enable access to other features (e.g., features for which access was disabled because they were not predicted to be accessed by the user). Selection of that option may cause display of a generic (e.g., not customized for the user, date, time, predicted functions, or the like) user interface.

Memory 112 may have, store and/or include a channel selection/transmission module 112h. The channel selection/transmission module 112h may store instructions and/or data that may cause or enable dynamic interface customization and generation computing platform 110 to select a channel or system to which the user interface will be transmitted and/or displayed. For instance, the customized user interface may be transmitted to one or more systems via one or more channels. For example, a user may be accessing a first system (such as an online banking application) and the generated customized user interface may be transmitted to the first system and may also be transmitted to a second system (e.g., based on a prediction that a user may access a second system such as an ATM). The prediction of the second system may, in some examples, be based on one or more machine learning datasets indicating a pattern of accessing the second system within a predetermined time of the first system on a particular day, at a particular time, or the like. Accordingly, the customized user interface may be transmitted to multiple systems based on predicted sequences, or the like, for the particular user.

Figure 2A:
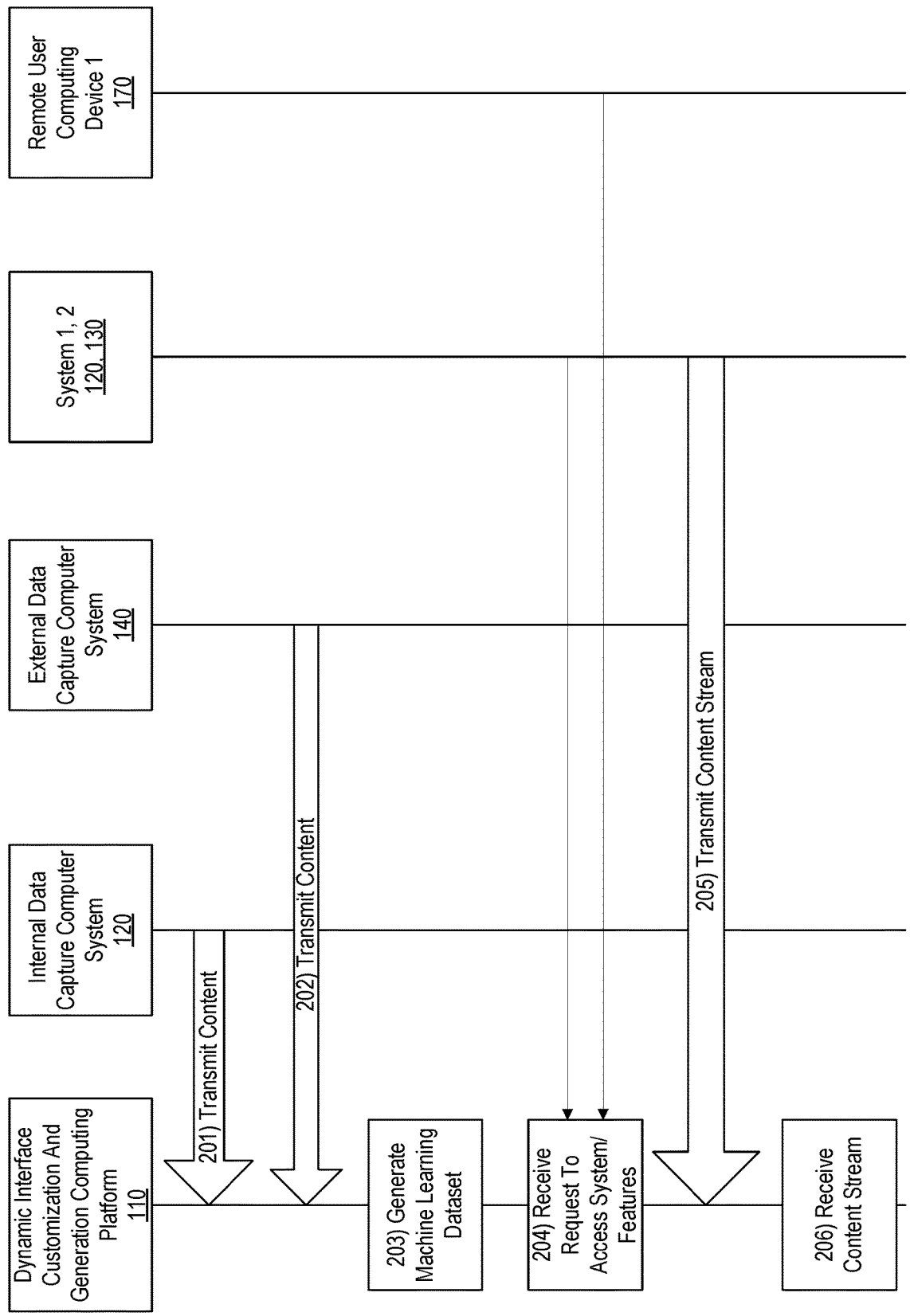
Figure 2C:
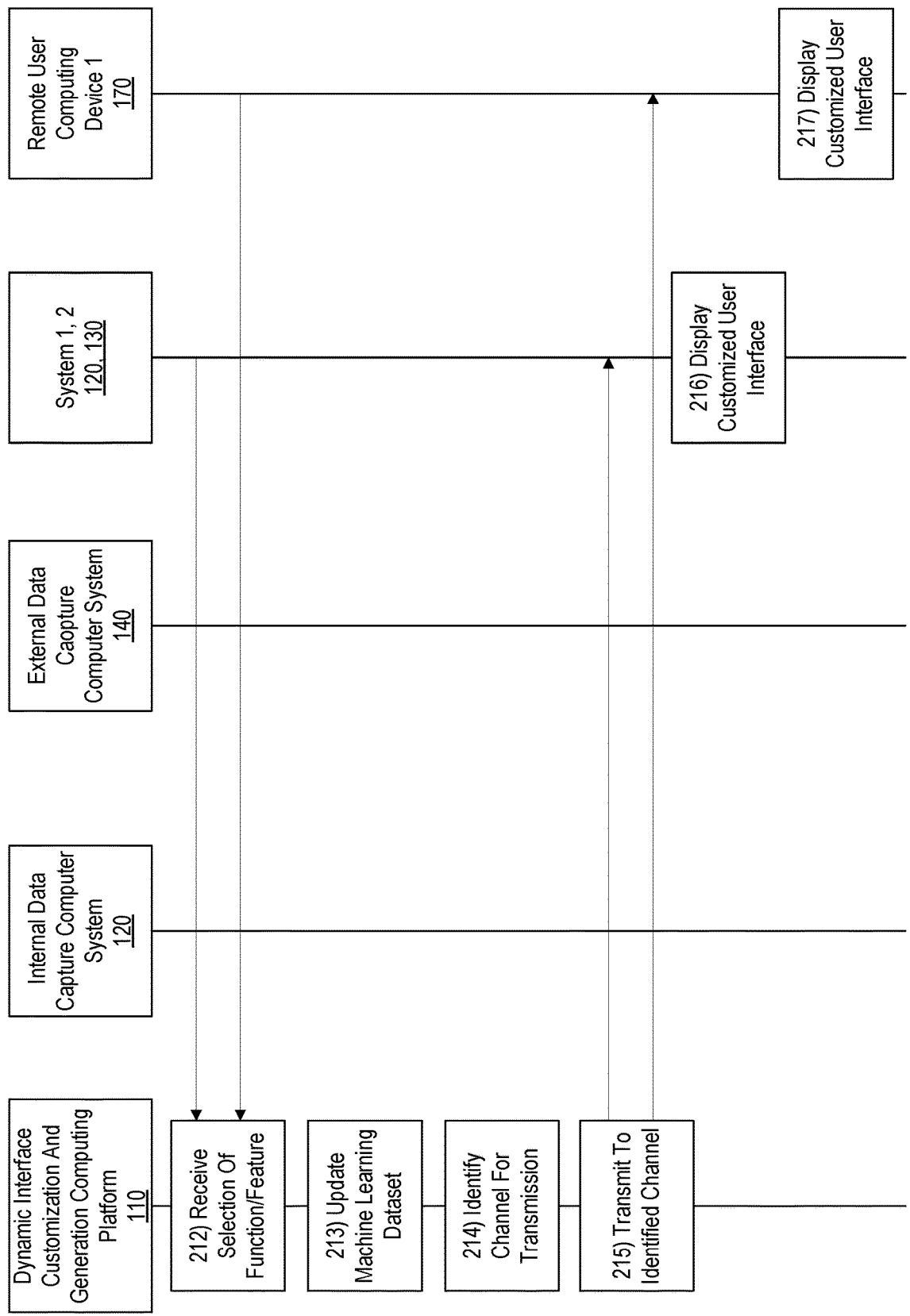

FIGS. 2A-2C depict an illustrative event sequence for implementing and using a data processing system with a machine learning engine to provide dynamic interface customization and generation functions in accordance with one or more aspects described herein. The events shown in the illustrative event sequence are merely one example sequence and additional events may be added, or events may be omitted, without departing from the invention.

Referring to FIG. 2A, at step 201, content may be received from an internal data capture computer system 140. At step 202, content may be received from an external data capture computer system 160. The content received in steps 201 and 202 may include data associated with a particular user (e.g., user identifying information), selections made in a system by a user, websites visited or other internet history, and the like.

In step 203, one or more machine learning datasets may be generated by a dynamic interface customization and generation computing platform (e.g., by machine learning engine 112d). The datasets may be generated using one or more machine learning algorithms and may be generated based on data from various sources (e.g., data received in steps 201 and 202), such as historical user data from internal systems, user data and activity from external systems, and the like. In some examples, one or more datasets may be received from a second entity, as described more fully herein.

At step 204, a request to access a system may be received. For example, a user may request to access a system, such as an online banking system, ATM or other self-service kiosk, call center system. In other examples, the request to access the system may be a user accessing a system associated with a second entity (e.g., different from the entity implementing the system). The request to access may include receipt of a user's login credentials, password, or the like, via one or more systems. In some examples, the system may be a device directly associated with the system (e.g., system associated with a first channel 120, system associated with a second channel 130, or the like). Additionally or alternatively, the request for access may be received via a remote user computing device 170, 175 (or local user computing device 150, 155) (e.g., as a user is accessing, for instance, an online or mobile banking application, an external entity system, or the like). In some examples, the user may be authenticated to the system by components of the system itself or via the dynamic interface customization and generation computing platform 110.

In some arrangements, the dynamic interface customization and generation computing platform 110 may continuously monitor one or more systems (e.g., online banking systems, ATM's or the like) to detect access. In other examples, a request for access may include transmission of a signal indicating that access has been requested.

At step 205, a content stream may be transmitted from the system being accessed by the user. For instance, a content stream may be transmitted from, for example, the online banking system, ATM, or the like, to which the user is requesting access. The content stream may be received in real-time (e.g., as the user is accessing the system) and may include data associated with an identity of the user accessing the system, time, date, day of week, day of month, or the like, associated with the attempted access. In some examples, the content stream may include data associated with the system or type of system being accessed (e.g., ATM, online or mobile banking, call center, or the like). At step 206, the received content stream may be received by the dynamic interface customization and generation computing platform 110.

With reference to FIG. 2B, at step 207, the received content stream may be analyzed. In some examples, the content stream may be analyzed in real-time in order to, for example, generate and display an appropriate customized user interface for the user. In some arrangements, analyzing the content stream may include extracting data associated with an identity of the user, time, day, day of week, day of month, at which the requested access is occurring, and the like. In some examples, data associated with a geographic location of the user (e.g., based on Global Positioning System (GPS) data from a mobile or other device associated with the user) or the like, may be extracted.

In step 208, a likely feature or function to be selected by the user may be predicted based on the received content stream. For example, the data extracted from the content stream during analysis of the content stream may be further analyzed based on one or more machine learning datasets (which may include machine learning training data). The analysis based on the one or more machine learning datasets may include predicting one or more features likely to be accessed by the user based on, e.g., time, date, day of week, day of month, or the like. The analysis based on the one or more machine learning datasets may be performed in real-time.

In some examples, identifying or predicting the likely feature or function may include identifying content external to the system. For instance, identifying or predicting the likely feature or function may include identifying content, links to external web sites, and the like, that may be of interest to the user. In some examples, historical internet activity of the user may be used to identify one or more links to websites having content that may be of interest to the user.

At step 209, access to the feature or function identified as likely to be selected by the user may be enabled. For example, the dynamic interface customization and generation computing platform 110 may enable access to the one or more features. In some examples, access to one or more features or functions not identified as likely to be selected by the user (e.g., based on the machine learning dataset analysis) may be disabled. Accordingly, the interface generated and provided to the user may include only features or functions to which access is enabled, or may include an indication of which features or functions have access enabled and which features or functions have access disabled, as will be discussed more fully below.

At step 210, an interface may be generated. The interface may be dynamically generated in real-time and include features of functions to which access is enabled (e.g., the features of functions identified as likely to be selected by the user). In some examples, generating the interface may include positioning the functions for which access is enabled in a predetermined location on the interface (e.g., in a substantially central region, in a top, left corner, or the like). In some arrangements, only the features or functions for which access is enabled may be displayed in the user interface. In some examples, an option may be provided (e.g., available for selection by a user) to provide access to additional functions (e.g., functions not currently enabled). Selection of that option may cause the dynamic interface customization and generation computing platform 110 to enable additional functions or features (e.g., those not identified as likely to be selected).

In some instances, generating the interface may include displaying both features to which access is enabled and features for which access is disabled. In these arrangements, the features for which access is disabled may be shown in an appearance different from features or functions for which access is enabled (e.g., disabled functions may be grayed out, displayed in smaller font, or the like).

In some examples, the generated user interface may include the external content or website links identified as potentially being of interest to the user.

At step 211, the generated user interface may be transmitted to one or more systems or devices for display. For example, the generated user interface may be transmitted to the system or device from which the request for access was received. The dynamic interface customization and generation computing platform 110 may cause the interface to be displayed (e.g., may transmit a command, signal, or instruction to display the generated interface on a display of the system).

With reference to FIG. 2C, at step 212, selection of one or more features or functions associated with the system (e.g., system 120, system 130, a system accessed via remote user computing device 170, or the like) may be received by the dynamic interface customization and generation computing platform 110. For instance, selection of the predicted function (e.g., the one or more functions or features for which access is enabled and presented in the interface) may be received. Additionally or alternatively, selection of an option to enable additional functions or features may be received.

At step 213, one or more machine learning datasets may be updated. For example, the data received in step 212 may be used to validate one or more machine learning datasets, one or more predicted functions, or the like. Accordingly, one or more machine learning datasets may be updated with this additional data (e.g., to improve accuracy, provide updated functionality, or the like).

At step 214, one or more additional channels for transmission/display of the generated user interface may be determined. In some examples, one or more machine learning datasets may be used to identify a sequence or pattern of access by a user. For instance, a user may frequently (e.g., at least a predetermined number of times within a predetermined time period) access a first system and, shortly thereafter, access a second system. Accordingly, the computing platform 110 may recognize this pattern and may transmit the customized generated user interface to the second system for display (e.g., after or in addition to display on the system or device from which the request for access was received).

At step 215, the generated user interface may be transmitted to the second system (e.g., one of systems 120, 130, a system accessed via a remote user computing device 170, 175, or the like). In steps 216 and 217, the dynamic interface customization and generation computing platform 110 may cause the interface to be displayed on the identified second system. For instance, the dynamic interface customization and generation computing platform 110 may transmit a command, instruction or signal to display the interface on a display of the selected system.

Figure 3:
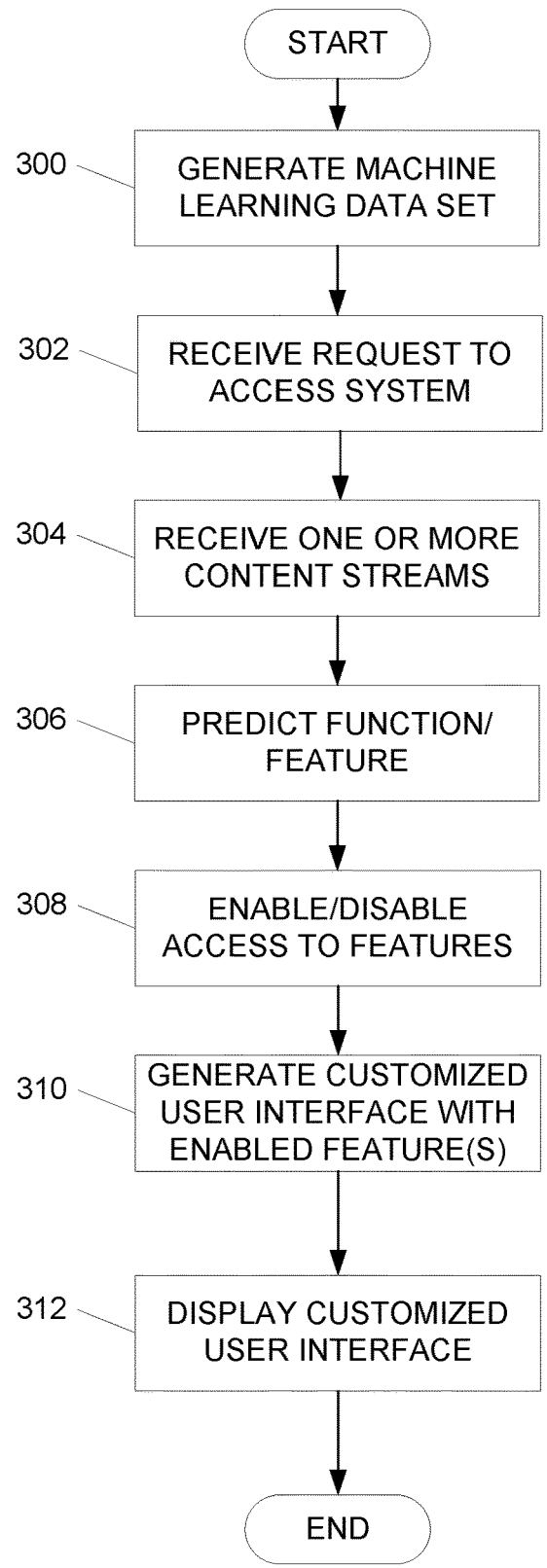
FIG. 3 depicts an illustrative method for implementing and using a data processing system with a machine learning engine to predict a feature or function likely to be accessed by a user and generate a customized interface, according to one or more aspects described herein.

FIG. 3 is a flow chart illustrating one example method of predicting a function or feature and generating a customized user interface, according to one or more aspects described herein. In step 300, one or more machine learning datasets may be generated. The machine learning datasets may be generated based on historical data (e.g., historical use data), training data (e.g., known patterns of selection, or like, internal system data (e.g., historical use of internal systems, functions or features selected, patterns of selections, and the like), external system data (e.g., historical use of external systems or sites, patterns or sequences of selection, types of websites visited, and the like), and the like. In some examples, one or more machine learning datasets may be received from one or more external systems or entities.

In step 302, a request to access one or more systems may be received. For instance, a user may request to access one or more systems, such as an ATM or other self-service kiosk, a call center system, an online or mobile application, or the like. The request to access the system may be received at the system (e.g., in the case of an ATM or call center system) or via another computing device, such as a remote user computing device 170, 175, local user computing device 150, 155, or the like. The request may include identification of the user.

In step 304, one or more content streams may be received. For instance, one or more content streams from the system the user is attempting to access may be received. The content stream(s) may include identification of the user, a time, date, day of week, day of month, or the like, at which the user is requesting access. The one or more content streams may be received in real-time.

In step 306, the received content streams may be analyzed (e.g., in real-time) to extract information associated with the identity of the user, time, date, and the like, and the extracted information may be further analyzed, based on one or more machine learning datasets, to predict one or more features or functions the user is likely to access, or select, or may find of interest.

In step 308, access to the predicted one or more functions or features may be enabled. In some examples, access to other features (e.g., features not predicted to be selected) may be disabled.

In step 310, a customized user interface may be generated. The customized user interface may include the feature or features for which access was enabled. In some examples, the interface may include only the feature or feature for which access was enabled. In other examples, the interface may include only the feature for which access was enabled and an option to enable access to additional features or functions. In some examples, the interface may include features for which access was enabled and features for which access was disabled and may display the different features with different appearances (e.g., in different colors, different fonts, different font sizes, or the like) to distinguish between the enabled and disabled functions.

In some examples, generating the user interface may include displaying the one or more functions for which access is enabled in a particular location on the interface. For example, the one or more function for which access is enabled may be displayed in central portion of the interface, in a top, left corner, or the like. As discussed herein, the generated user interface may be customized for the user based on the one or more machine learning datasets. Accordingly, two users may have the same identified feature for display but the feature may be displayed in a different location, configuration, or the like, based on the machine learning datasets.

In step 312, the generated customized user interface may be displayed on one or more devices. For example, the dynamic interface customization and generation computing platform 110 may cause the interface to be displayed on a display of the system being accessed by the user and/or one or more other systems.

Figure 4:
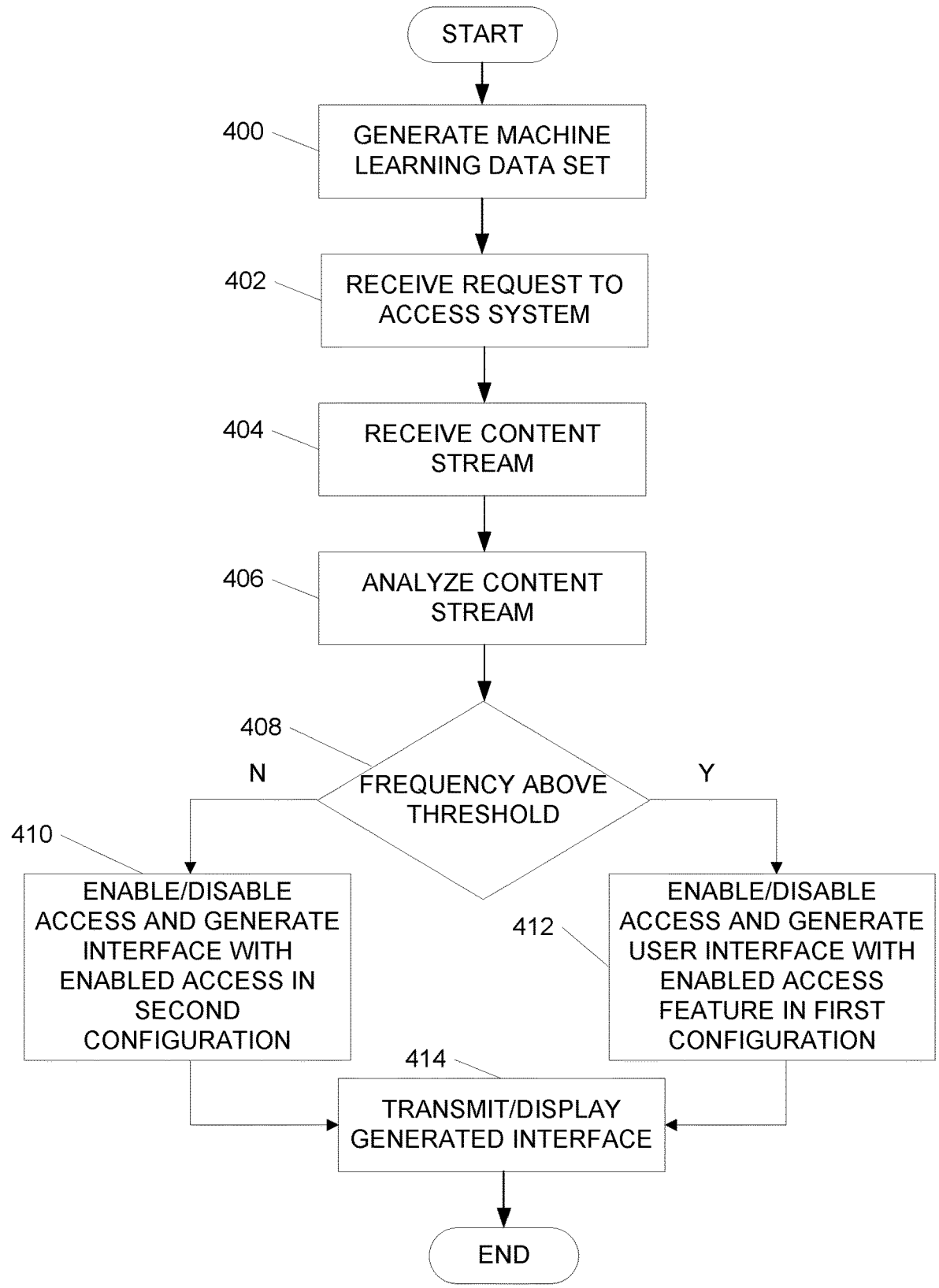
FIG. 4 depicts an illustrative method for implementing and using a data processing system with a machine learning engine to predict a feature or function likely to be accessed by a user and generate a customized interface, according to one or more aspects described herein.

FIG. 4 illustrates another example method of predicting one or more features or functions likely to be accessed and generating a customized user interface according to one or more aspects described herein. In step 400, one or more machine learning datasets may be generated. Similar to the arrangements discussed above, the machine learning datasets may be generated using various machine learning algorithms and may be based on historical data, internal system data, external system data, and the like.

In step 402, a request to access one or more systems may be received. Similar to the arrangements discussed above, access may include a user inputting his or her login credentials, biometric data, or the like. In step 404, one or more content streams may be received. As discussed above, the content streams may be received from one or more systems being monitored, and, for example, the system for which the user is requesting access.

In step 406, the content stream may be analyzed based on one or more machine learning datasets to identify one or more features or functions the user is likely to access via the system. In step 408, a determination is made, based on the one or more machine learning datasets, as to whether a frequency of user selection of the predicted feature is above a predetermined threshold (e.g., if the frequency of user selection of the identified predicted feature is above a threshold number of times within a predetermined time period).

If, in step 408, the frequency of user selection is above the predetermined threshold, access to the predicted feature may be enabled, access to one or more other features may be disabled, and a user interface may be generated including the predicted feature displayed in a first configuration. For example, the predicted feature may be the only feature for which access is enabled and the predicted feature may be prominently displayed in a larger than standard font size in a middle of the interface. Various other configurations may be used as the first configuration without departing from the invention.

Figure 5:
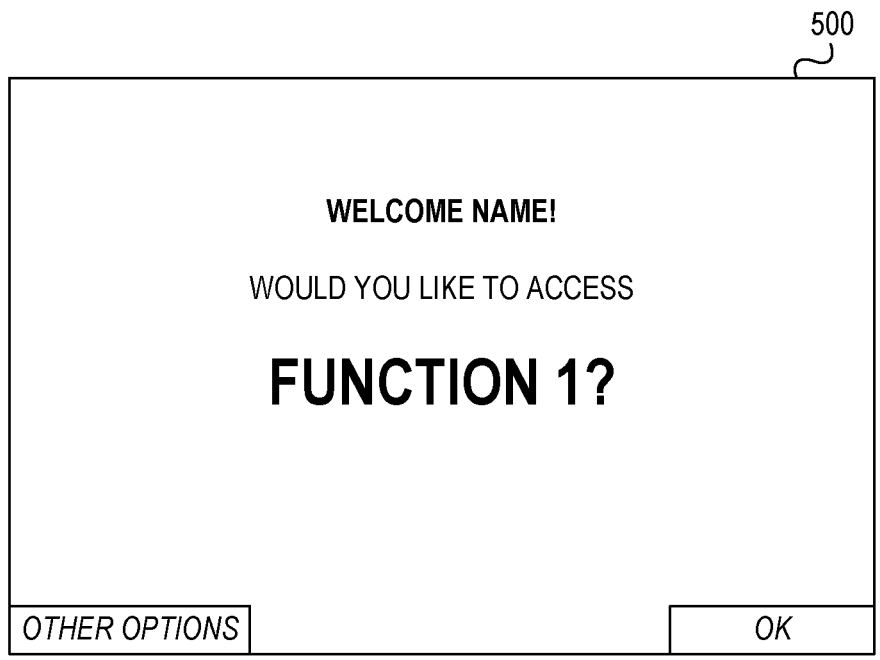
FIG. 5 illustrates one example user interface for implementing and using a data processing system with a machine learning engine to provide function prediction and dynamic interface functions according to one or more aspects described herein.

FIG. 5 illustrates one example user interface displaying the predicted function or feature. As shown in interface 500, the only function of the system (e.g., other than requesting additional functions) displayed is the predicted function. The predicted function is shown, in the example interface 500 of FIG. 5, in a larger than standard font and in a substantially central portion of the interface 500. Selection of "other options" option may cause the dynamic interface customization and generation computing platform 110 to enable access to one or more additional functions and display a user interface including the accessible functions. As indicated above, the arrangement shown in FIG. 5 is merely one example arrangement. Various other configurations may be used without departing from the invention.

If, in step 408, the frequency of user selection is not above the predetermined threshold, access to the predicted feature may be enabled, access to one or more other features may also be enabled, access to one or more other features may be disabled, and a user interface may be generated with the predicted feature in a second configuration different from the first configuration. For example, access to the predicted feature and a second feature may be enabled, while access to a third feature may be disabled. The user interface may include the both the predicted feature and the second feature and the predicted feature may be displayed in a same font size as the second feature and in an upper left corner of the interface, while the second feature is displayed in a lower portion of the interface. Various other second configurations may be used without departing from the invention.

Figure 6:
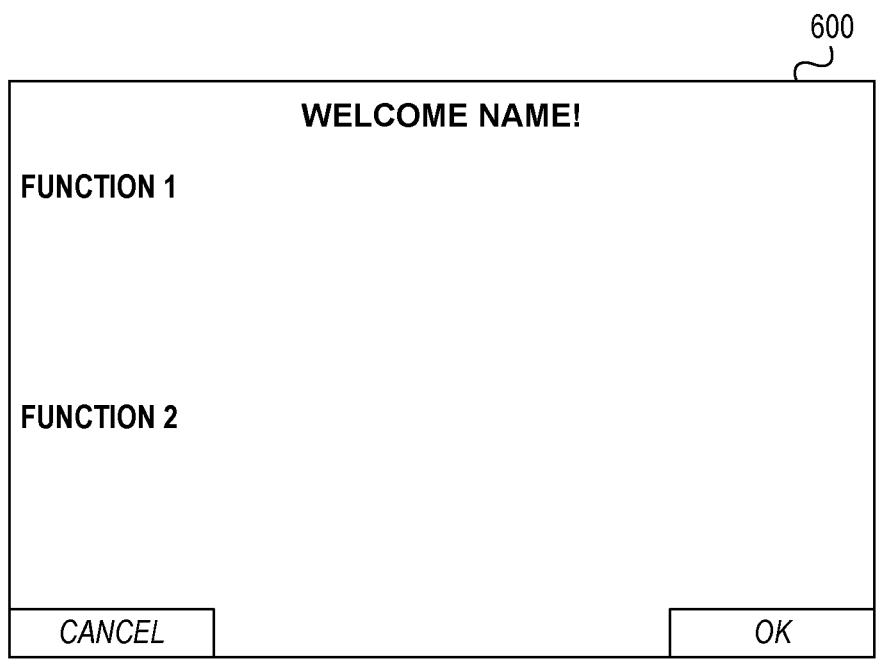
FIG. 6 illustrates another example user interface for implementing and using a data processing system with a machine learning engine to provide function prediction and dynamic interface functions according to one or more aspects described herein.

FIG. 6 illustrates another example user interface 600 displaying the predicted function and an additional function. The predicted function (e.g., function 1) may be displayed in an upper right corner or region of the interface 600, while a second function (e.g., function 2) may be displayed in a lower region of the interface 600. As indicated above, the arrangement shown in FIG. 6 is merely one example arrangement. Various other configurations may be used without departing from the invention.

In step 414, the generated user interface may be transmitted to the system to which the user is requesting access and the dynamic interface customization and generation computing platform 110 may cause the generated interface to be displayed on a display of the system.

Figure 7:
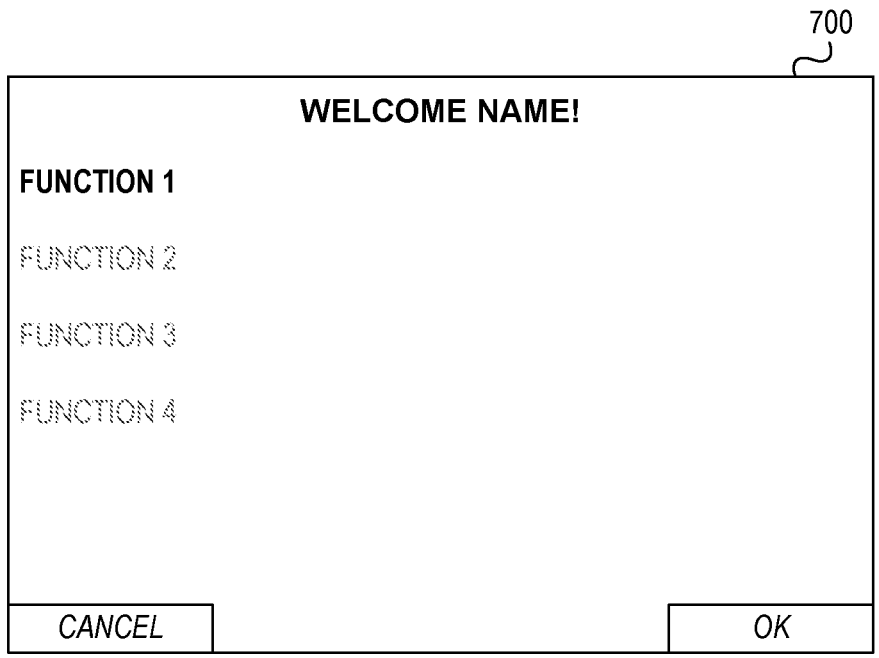
FIG. 7 illustrates another example user interface for implementing and using a data processing system with a machine learning engine to provide function prediction and dynamic interface functions according to one or more aspects described herein.
Figure 8:
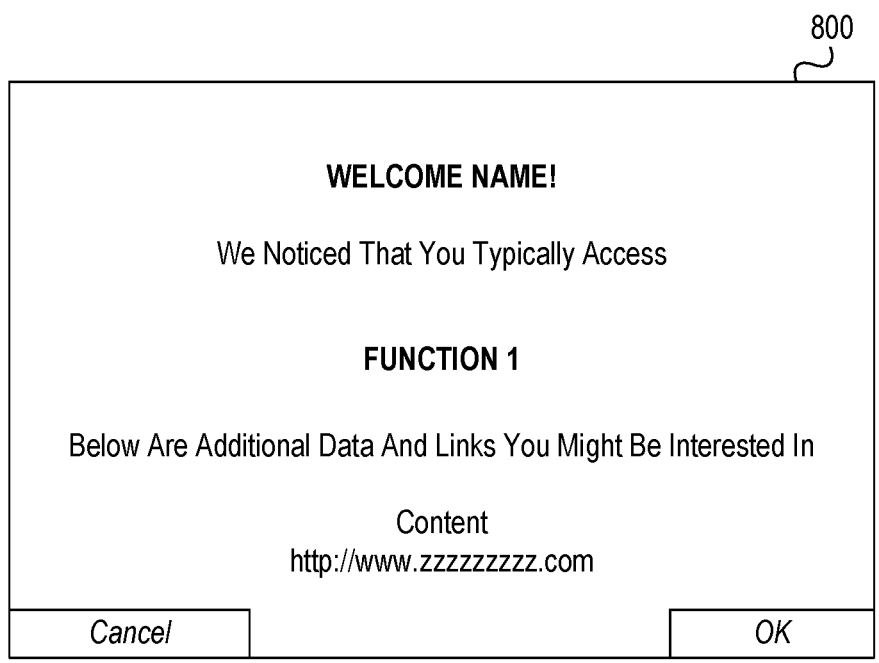
FIG. 8 illustrates another example user interface for implementing and using a data processing system with a machine learning engine to provide function prediction and dynamic interface functions according to one or more aspects described herein.

FIGS. 7 and 8 illustrate additional example user interfaces that may be generated by the dynamic interface customization and generation computing platform 110. The interfaces 700, 800 are merely two example interfaces and various other configurations may be used without departing from the invention.

With reference to FIG. 7, the interface 700 includes the predicted feature (e.g., feature 1) as well as other features (feature 2, feature 3, feature 4). However, the other features displayed (e.g., those other than the predicted feature) are shown as grayed-out, to indicate that they are not currently accessible to the user. In some examples, selection of "cancel" option may cause the system to enable access to the grayed-out features and display them in a manner similar to or the same as the predicted feature, which is accessible.

FIG. 8 illustrates one example user interface displaying the predicted function or feature and also providing additional content to the user. In some examples, the one or more machine learning datasets may be used to identify other content, websites, or the like, that may be of interest to the user based on previous internet history, internal system history, or the like. Accordingly, in generating the user interface, the interface 800 may include the identified function likely to be access by the user, as well as additional content and/or links to websites that might also be of interest to the user. For example, if a user has accessed an online banking system to review mortgage information, and external system data indicates that the user has been viewing homes for sale online, this data may be used to generate one or more machine learning datasets. Accordingly, when a user accesses the system again, the predicted function may be an application for a mortgage and the additional content or links may include links to home sale websites. This is merely one example of using data from various sources to generate and apply machine learning datasets to predict user actions and generate customized interfaces according to one or more aspects described herein. Various other examples may be performed without departing from the invention.

As discussed herein, the use of machine learning allows the computing platform to efficiently and accurately process vast amounts of data to evaluate and monitor user activity on both systems internal to an entity and external to an entity to predict one or more functions or features a user is likely to select. A customized user interface may then be generated and presented to the user including the predicted function or feature. Accordingly, if, based on machine learning, the system recognizes that a user logs on to an online banking system each weekday morning at 9:00 a.m. to check his or her balance, and request for the user to access the online banking system is received at 9:00 a.m. on a weekday, the system may predict that the user is going to check his or her balance. Accordingly, access to a balance check function may be enabled and a customized user interface may be generated providing "check balance" as an available feature. In some examples, the "check balance" feature may be displayed in a predetermined position on the interface, such as in a central location.

As discussed above, one or more arrangements discussed herein may be used with one or more different types of systems operating via different channels. For instance, aspects may be used with online or mobile banking applications, call center systems, ATM's or other self-service kiosks, and the like. Accordingly, activity by a user may be received in various different ways. For instance, data may be input to a personal computing device of the user, selections may be made directly into a system computing device, selections may be made using audible or voice commands, and the like. Accordingly, activity received via different forms of input may be monitored and used to generate machine learning datasets, as well as to identify predicted likely functions, generate a customized user interface, and the like.

As discussed herein, generating a customized user interface may include displaying certain functions as available or unavailable, displaying certain functions in a predetermined location, and the like. Additionally or alternatively, one or more machine learning datasets may be used to identify other patterns of use and modify or generate customized user interfaces based on those patterns. For example, if a user frequently zooms into a website when it opens, the system may automatically display a website in a zoomed in configuration to aid in efficiently presenting information to the user.

In another example, if a website has recently been redesigned, the system may recognize this and highlight a location of features that were frequently used by the user (e.g., via the old layout).

Additionally or alternatively, the arrangements discussed herein may use machine learning to identify external content that may be of interest to a user. For instance, if a user has recently been reviewing real estate websites, the user may be shopping for a mortgage. Accordingly, upon logging into an online banking system, a function to apply for a mortgage may be provided. Additionally or alternatively, other content, one or more links to websites for real estate, and the like, may be provided via the customized user interface.

In some examples, a user may desire to opt out of the dynamic interface arrangements discussed herein. Accordingly, a user may select an opt out option and a generic interface will then be presented to the user upon accessing the system.

Also, as discussed herein, one or more customized user interfaces may be displayed to a user on different or additional systems. For instance, a particular interface, or interface arrangement, that has been customized for a user via an online banking application may also be presented to the user upon attempting to access an ATM.

The customized interface arrangements generated based on machine learning described herein provide a unique customer experience. The interfaces may be generated in real-time based on streaming data or data received and processed in real-time in order to quickly and efficiently predict features likely to be desirable to the user and display those features to the user in an efficient, simplified manner.

Figure 9:
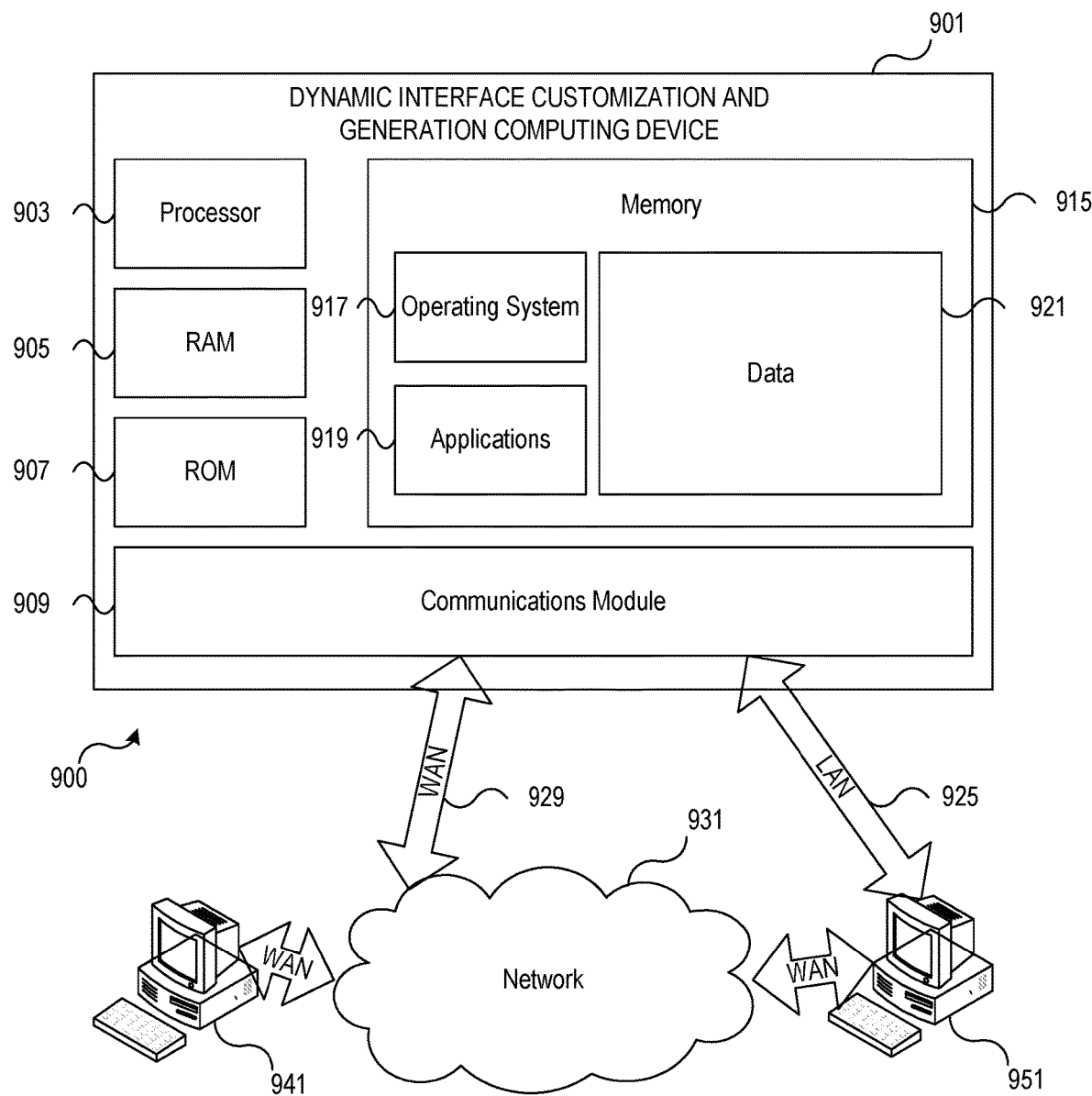
FIG. 9 illustrates one example operating environment in which various aspects of the disclosure may be implemented in accordance with one or more aspects described herein.

FIG. 9 depicts an illustrative operating environment in which various aspects of the present disclosure may be implemented in accordance with one or more example embodiments. Referring to FIG. 9, computing system environment 900 may be used according to one or more illustrative embodiments. Computing system environment 900 is only one example of a suitable computing environment and is not intended to suggest any limitation as to the scope of use or functionality contained in the disclosure. Computing system environment 900 should not be interpreted as having any dependency or requirement relating to any one or combination of components shown in illustrative computing system environment 900.

Computing system environment 900 may include dynamic interface customization and generation computing device 901 having processor 903 for controlling overall operation of dynamic interface customization and generation computing device 901 and its associated components, including Random-Access Memory (RAM) 905, Read-Only Memory (ROM) 907, communications module 909, and memory 915. Dynamic interface customization and generation computing device 901 may include a variety of computer readable media. Computer readable media may be any available media that may be accessed by dynamic interface customization and generation computing device 901, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 901.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic interface customization and generation computing device 901. Such a processor may execute computer-executable instructions stored on a computer-readable medium.

Software may be stored within memory 915 and/or storage to provide instructions to processor 903 for enabling dynamic interface customization and generation computing device 901 to perform various functions. For example, memory 915 may store software used by dynamic interface customization and generation computing device 901, such as operating system 917, application programs 919, and associated database 921. Also, some or all of the computer executable instructions for dynamic interface customization and generation computing device 901 may be embodied in hardware or firmware. Although not shown, RAM 905 may include one or more applications representing the application data stored in RAM 905 while dynamic interface customization and generation computing device 901 is on and corresponding software applications (e.g., software tasks) are running on dynamic interface customization and generation computing device 901.

Communications module 909 may include a microphone, keypad, touch screen, and/or stylus through which a user of dynamic interface customization and generation computing device 901 may provide input, and may also include one or more of a speaker for providing audio output and a video display device for providing textual, audiovisual and/or graphical output. Computing system environment 900 may also include optical scanners (not shown). Exemplary usages include scanning and converting paper documents, e.g., correspondence, receipts, and the like, to digital files.

Dynamic interface customization and generation computing device 901 may operate in a networked environment supporting connections to one or more remote computing devices, such as computing devices 941 and 951. Computing devices 941 and 951 may be personal computing devices or servers that include any or all of the elements described above relative to dynamic interface customization and generation computing device 901.

The network connections depicted in FIG. 9 may include Local Area Network (LAN) 925 and Wide Area Network (WAN) 929, as well as other networks. When used in a LAN networking environment, dynamic interface customization and generation computing device 901 may be connected to LAN 925 through a network interface or adapter in communications module 909. When used in a WAN networking environment, dynamic interface customization and generation computing device 901 may include a modem in communications module 909 or other means for establishing communications over WAN 929, such as network 931 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 10:
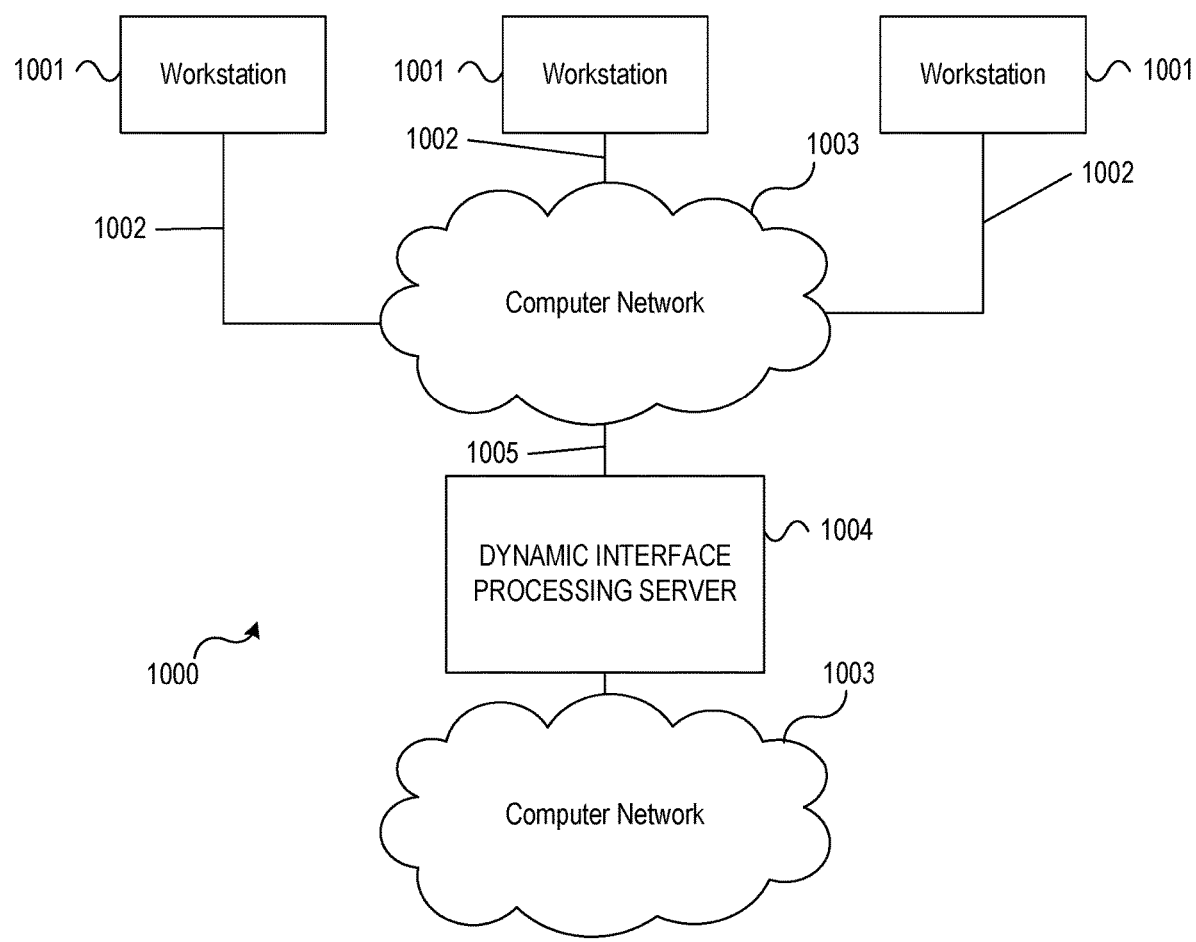
FIG. 10 depicts an illustrative block diagram of workstations and servers that may be used to implement the processes and functions of certain aspects of the present disclosure in accordance with one or more aspects described herein.

FIG. 10 depicts an illustrative block diagram of workstations and servers that may be used to implement the processes and functions of certain aspects of the present disclosure in accordance with one or more example embodiments. Referring to FIG. 10, illustrative system 1000 may be used for implementing example embodiments according to the present disclosure. As illustrated, system 1000 may include one or more workstation computers 1001. Workstation 1001 may be, for example, a desktop computer, a smartphone, a wireless device, a tablet computer, a laptop computer, and the like, configured to perform various processes described herein. Workstations 1001 may be local or remote, and may be connected by one of communications links 1002 to computer network 1003 that is linked via communications link 1005 to dynamic interface processing server 1004. In system 1000, dynamic interface processing server 1004 may be any suitable server, processor, computer, or data processing device, or combination of the same, configured to perform the functions and/or processes described herein. Server 1004 may be used to process received content streams to determine or predict a function likely to be accessed by a user, generate a customized user interface, and the like.

Computer network 1003 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 1002 and 1005 may be any communications links suitable for communicating between workstations 1001 and dynamic interface processing server 1004, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
    at a computing platform comprising at least one processor, memory, and a communication interface:
        receiving, by the at least one processor and via the communication interface, user input requesting access to a self-service kiosk providing banking features;
        receiving, by the at least one processor, in real-time and from the self-service kiosk, a content data stream including information associated with a user requesting access, the self-service kiosk to which access is requested and a time and date of the requested access;
        extracting, in real-time and by the at least one processor and from the received content data stream, data identifying the user associated with the user input and the time and date;
        responsive to extracting the data, predicting, by the at least one processor and based on a machine learning dataset and the extracted data identifying the user and the time and date, a first banking feature of the self-service kiosk likely to be accessed by the user associated with the user input;

based on the predicted first banking feature of the self-service kiosk likely to be accessed by the user, enabling, by the at least one processor, access to the first banking feature of the self-service kiosk and disabling, by the at least one processor, access to a second banking feature of the self-service kiosk;

generating, by the at least one processor, a customized user interface customized based on the extracted data and the predicted first banking feature, the customized user interface including the first banking feature of the self-service kiosk for which access is enabled; and displaying the generated customized user interface on a display of the self-service kiosk.

2. The method of claim 1, wherein the machine learning dataset is generated based on data from a plurality of sources and wherein the plurality of sources includes at least one database including historical data associated with features of the self-service kiosk selected by the user.

3. The method of claim 1, wherein generating the customized user interface further includes displaying the first banking feature in a first predetermined location on the customized interface.

4. The method of claim 3, wherein generating the customized user interface further includes displaying the second banking feature in a second predetermined location on the customized user interface and the displayed second banking feature including an indication that access to the second banking feature is disabled.

5. The method of claim 4, wherein generating the customized user interface further includes displaying an option on the customized user interface to display a non-customized user interface of the self-service kiosk.

6. The method of claim 1, wherein the machine learning dataset is generated based on a frequency of use of the first banking feature by the user within a predetermined period of time.

7. The method of claim 1, wherein the machine learning dataset is generated based on sequences of selections made by the user.

8. The method of claim 1, further including:
identifying, by the at least one processor, a second computing device, the second computing device being a user computing device associated with the user;
transmitting, by the at least one processor, the generated customized user interface to the second computing device; and
displaying the generated customized user interface on a display of the second computing device.

9. The method of claim 8, wherein the second computing device is identified based on a pattern of the user previously accessing the second computing device within a predetermined time of accessing the self-service kiosk.

10. The method of claim 8, wherein the second computing device is identified based on a number of times the user previously accessed the second computing device within a predetermined time of accessing the self-service kiosk.

11. The method of claim 1, wherein the customized user interface further includes an option to enable the second banking feature.

12. One or more non-transitory computer-readable media storing instructions that, when executed by a computing platform comprising at least one processor, memory, and a communication interface, cause the computing platform to:

receive, via the communication interface, user input requesting access to a self-service kiosk providing banking features;

receive, in real-time and from the self-service kiosk, a content data stream including information associated with a user requesting access, the self-service kiosk to which access is requested and a time and date of the requested access;

extract, in real-time and from the received content data stream, data identifying the user associated with the user input and the time and date;

responsive to extracting the data, predict, based on a machine learning dataset and the extracted data identifying the user and the time and date, a first banking feature of the self-service kiosk likely to be accessed by the user associated with the user input;

based on the predicted first banking feature self-service kiosk likely to be accessed by the user, enable access to the first banking feature of the self-service kiosk and disable access to a second banking feature of the self-service kiosk-;

generate a customized user interface customized based on the extracted data and the predicted first banking feature, the customized user interface including the first banking feature of the self-service kiosk for which access is enabled; and display the generated customized user interface on a display of the self-service kiosk.

13. The one or more non-transitory computer-readable media of claim 12, wherein the machine learning dataset is generated based on data from a plurality of sources and wherein the plurality of sources includes at least one database including historical data associated with features of the self-service kiosk selected by the user and at least one database including historical data associated with an internet browsing activity of the user.

14. The one or more non-transitory computer-readable media of claim 12, wherein generating the customized user interface further includes displaying the first feature in a first predetermined location on the customized interface.

15. The one or more non-transitory computer-readable media of claim 14, wherein generating the customized user interface further includes displaying the second banking feature in a second predetermined location on the customized user interface and the displayed second banking feature including an indication that access to the second banking feature is disabled.

16. The one or more non-transitory computer-readable media of claim 12, wherein the machine learning dataset is generated based on sequences of selections made by the user.

17. A dynamic interface customization and generation computing platform, comprising:
at least one processor;
a communication interface communicatively coupled to the at least one processor; and
memory storing computer-readable instructions that, when executed by the at least one processor, cause the dynamic interface customization and generation computing platform to:
receive, via the communication interface, user input requesting access to a self-service kiosk providing banking features;
receive, in real-time and from the self-service kiosk, a content data stream including information associated with a user requesting access, the self-service kiosk to which access is requested and a time and date of the requested access;

extract, in real-time and from the received content data stream, data identifying the user associated with the user input and the time and date;

responsive to extracting the data, predict, based on a machine learning dataset and the extracted data identifying the user and the time and date, a first banking feature of the self-service kiosk likely to be accessed by the user associated with the user input;

based on the predicted first banking feature of the self-service kiosk likely to be accessed by the user, enable access to the first banking feature of the self-service kiosk and disable access to a second banking feature of the self-service kiosk;

generate a customized user interface customized based on the extracted data and the predicted first banking feature, the customized user interface including the first banking feature of the self-service kiosk for which access is enabled; and display the generated customized user interface on device display of the self-service kiosk.

18. The dynamic interface customization and generation computing platform of claim 17, wherein the machine learning dataset is generated based on data from a plurality of sources and wherein the plurality of sources includes at least one database including historical data associated with features of the self-service kiosk previously selected by the user.

19. The dynamic interface customization and generation computing platform of claim 18, wherein the plurality of sources further includes at least one database including historical data associated with internet browsing of the user.

20. The dynamic interface customization and generation computing platform of claim 17, wherein generating the customized user interface further includes displaying the first banking feature in a first predetermined location on the customized user interface.

21. The dynamic interface customization and generation computing platform of claim 20, wherein generating the customized user interface further includes displaying the second banking feature in a second predetermined location on the customized user interface and the displayed second banking feature including an indication that access to the second feature is disabled.

22. The dynamic interface customization and generation computing platform of claim 21, wherein generating the customized user interface further includes displaying an option on the customized user interface to perform at least one of: enabling access to the second banking feature and directing the dynamic interface customization and generation computing platform to display a non-customized user interface of the self-service kiosk.

23. The dynamic interface customization and generation computing platform of claim 17, wherein the machine learning dataset is generated based on a frequency of use of the first banking feature by the user within a predetermined period of time.

24. The dynamic interface customization and generation computing platform of claim 17, wherein the machine learning dataset is generated based on sequences of selections made by the user.

25. The dynamic interface customization and generation computing platform of claim 17, wherein the generated customized user interface includes only the first banking feature of the self-service kiosk and does not include the second banking feature of the self-service kiosk.

* * * * *